United States Patent
Murphree et al.

(10) Patent No.: US 10,574,427 B2
(45) Date of Patent: Feb. 25, 2020

(54) ASSURED DATA TRANSFER FOR FULL-DUPLEX COMMUNICATION

(71) Applicant: Foster-Miller, Inc., Waltham, MA (US)

(72) Inventors: Michael Murphree, Mansfield, MA (US); Neil Judell, Cambridge, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 16/165,231

(22) Filed: Oct. 19, 2018

(65) Prior Publication Data

US 2019/0123884 A1 Apr. 25, 2019

Related U.S. Application Data

(60) Provisional application No. 62/575,046, filed on Oct. 20, 2017.

(51) Int. Cl.
*H04L 5/14* (2006.01)
*H04L 1/18* (2006.01)
*H04L 1/16* (2006.01)

(52) U.S. Cl.
CPC .............. *H04L 5/14* (2013.01); *H04L 1/1664* (2013.01); *H04L 1/1809* (2013.01); *H04L 1/1864* (2013.01); *H04L 1/1896* (2013.01)

(58) Field of Classification Search
None
See application file for complete search history.

(56) References Cited

U.S. PATENT DOCUMENTS

| 8,458,548 | B2 | 6/2013 | Lomnitz | |
| 9,253,670 | B2* | 2/2016 | Kim | H04B 7/0413 |
| 2001/0055311 | A1* | 12/2001 | Trachewsky | H04L 1/0003 |
| | | | | 370/445 |
| 2002/0054574 | A1* | 5/2002 | Beach | H04L 47/14 |
| | | | | 370/279 |
| 2003/0002449 | A1* | 1/2003 | Rittle | H04L 1/1671 |
| | | | | 370/277 |

(Continued)

FOREIGN PATENT DOCUMENTS

WO 2016205129 A1 12/2016

*Primary Examiner* — Kevin D Mew
(74) *Attorney, Agent, or Firm* — Iandiorio Teska & Coleman, LLP (57) ABSTRACT

In a full duplex data transfer method system, a first transceiver and a second transceiver are configured to transmit and receive data packets. At the first transceiver, a status indicator is added to each data packet in a set of data packets and the status indicator of each data packet is initially set to not transmitted. A list of all data packets having a status indicator set to not transmitted is maintained.
All data packets of the set are transmitted from the first transceiver to the second transceiver while the first transceiver receives transmissions from the second transceiver. At the second transceiver, all data packets received are saved and an indication regarding the data packets received are transmitted back to the first transceiver. At the first transceiver, the status indicator of all data packets in the list received by the second transceiver are set to received. The first transceiver then retransmits to the second transceiver all data packets of the set in the list having an indicator set to not transmitted.

12 Claims, 7 Drawing Sheets

(56) References Cited

U.S. PATENT DOCUMENTS

| | | | |
|---|---|---|---|
| 2005/0071733 A1* | 3/2005 | Fukae | G06F 13/426 714/776 |
| 2007/0255116 A1* | 11/2007 | Mehta | A61B 5/0002 600/300 |
| 2007/0258395 A1* | 11/2007 | Jollota | A61B 5/14532 370/310 |
| 2015/0016310 A1* | 1/2015 | Yi | H04B 7/2615 370/277 |
| 2015/0030090 A1* | 1/2015 | You | H04L 5/14 375/260 |
| 2015/0264626 A1* | 9/2015 | Perdomo | H04W 40/12 370/216 |
| 2016/0212734 A1* | 7/2016 | He | H04L 5/0055 |
| 2017/0367058 A1* | 12/2017 | Pelletier | H04W 56/0045 |
| 2018/0234207 A1* | 8/2018 | Clevorn | H04L 1/0026 |

* cited by examiner

ASSURED DATA TRANSFER FOR FULL-DUPLEX COMMUNICATION

RELATED APPLICATIONS

This application claims benefit of and priority to U.S. Provisional Application Ser. No. 62/575,046 filed Oct. 20, 2017 under 35 U.S.C. §§ 119, 120, 363, 365, and 37 C.F.R. § 1.55 and § 1.78 and which is incorporated herein by this reference.

FIELD OF THE INVENTION

This subject invention relates to reliable data transmission.

BACKGROUND OF THE INVENTION

Reliable data transmission is used when two entities (such as two computers) communicate and it is essential that all data goes correctly from the transmitter to the receiver. Data are usually sent as packets, with an extra bit of data added which permits verification that the data packet has been received correctly. Using such techniques, the receiver is certain that it has received all the data correctly, and the transmitter is aware that the receiver has correctly received all the data, even in the presence of communication errors and dropout.

Typical communication channels are radio communication, Ethernet or underwater acoustic communication. Some reliable data transmission techniques are designed for half-duplex communication when using the same frequency for both transmitting and receiving. In half-duplex communication the sending station transmits a packet, turns off the transmitter, and waits to receive data from the receiving station. A typical protocol for reliable data transmission is Automatic ReQuest (ARQ). The sending station prepares a packet of data, and appends a verification piece, such as a checksum or cyclic redundancy check (CRC). This packet is sent. The receiving station receives the packet, checks the integrity of the data. If the data are correct, the receiving station transmits an acknowledgment (ACK). If the data are incorrect, the receiving station transmits a negative acknowledgment (NAK). The sending station waits for the ACK/NAK. If it receives an ACK, the sender proceeds to the next packet. If the sender receives a NAK, it retransmits the packet. After a predetermined wait time, if the sender detects no response at all, it assumes a NAK was sent, and resends the packet. See U.S. Pat. No. 8,458,548 incorporated herein by this reference.

BRIEF SUMMARY OF THE INVENTION

The invention relates to reliable data transmission. Reliable data transmission is used when two entities (such as two computers) communicate and it is essential that all data goes correctly from the transmitter to the receiver. Data are usually sent as packets, with an extra bit of data added which permits verification that the data packet has been received correctly. Using such techniques, the receiver is certain that it has received all the data correctly, and the transmitter is aware that the receiver has correctly received all the data correctly.

Data communication is accomplished using modulation and demodulation. This typically involves sending a series of symbols to represent the data. A modulator in common use is called 256QAM, in which the phase and amplitude of a pulse are manipulated to be able to represent one of 256 values—or 8 bits per symbol. A packet includes a series of symbols, which will take a certain amount of time to transmit: the packet duration. The packet will take a certain amount of time to propagate from the sender to the receiver—this is equal to the distance between stations divided by the propagation velocity in the medium: speed of light for radio waves, speed of sound for acoustic systems. This is the propagation delay. If the propagation delay is a significant fraction of the packet duration (or is even longer than the packet duration), then there is a great deal of dead time for the sending station. The timeline for ARQ is as follows:

| Time | Event |
| --- | --- |
| 0 | Sender begins transmission of packet |
| Packet duration | Sender transmits last symbol in packet |
| Packet duration + propagation delay | Last symbol of first packet arrives at receiver, receiver sends ACK or NAK |
| Packet duration + 2*propagation delay | Sender receives ACK or NAK, restarts transmission of first packet or starts transmission of $2^{nd}$ packet, depending on ACK/NAK result |

Thus, with techniques like ARQ, the channel usage efficiency decreases as the propagation delay becomes larger. A fairly typical radio communication system may have a raw data rate of 100 Mbits/sec and a packet length of 1024 bytes. This yields packet duration of about 82 uSec. If the sender is an earth station, and the receive station is a satellite in geosynchronous orbit, then the propagation delay is approximately 117 mSec. Such a system would be grossly inefficient, with the transmitter remaining off roughly 99.93% of the time. Selection of packet length for the operating conditions becomes important. If the packet is too short, much time is wasted in propagation delay. If the packet becomes long enough that efficiency begins to be good, then the probability that the packet could have an error and need to be retransmitted becomes high, imposing a different efficiency penalty.

Featured is a full duplex data transfer method. A first transceiver and a second transceiver are configured to transmit and receive data packets. At the first transceiver, a status indicator is added to each data packet in a set of data packets and the status indicator of each data packet is initially set to not transmitted. A list of all data packets having a status indicator set to not transmitted is maintained.

All data packets of the set are transmitted from the first transceiver to the second transceiver while the first transceiver receives transmissions from the second transceiver. At the second transceiver, all data packets received are saved and an indication regarding the data packets received are transmitted back to the first transceiver. At the first transceiver, the status indicator of all data packets in the list received by the second transceiver are set to received. The first transceiver then retransmits to the second transceiver all data packets of the set in the list having an indicator set to not transmitted.

Preferably, the first transceiver initializes a transmission to the second transceiver by transmitting to the second transmission a request to initiate a transmission with an indication of the total number of packets to be transmitted. Also, the second transceiver, upon receipt of the request, preferably transmits an acknowledgment of the request to the first transceiver.

The status indicator is usually a bit in each data packet. Transmissions from the first transceiver to the second transceiver and transmissions from the second transceiver to the first transceiver are preferably continuous and via the same predetermined band of frequencies.

Also featured is a full duplex data transfer system comprising a first transceiver configured to transmit and receive data packets, to add a status indicator to each data packet in a set of data packets, to set the status indicator of a set of data packets to not transmitted, to maintain a list of packets having a status indicator set to not transmitted, to transmit the set of data packets to a second transceiver, to set the status indicator of all data packets in the list received by the second transceiver to transmitted, and to retransmit to the second transceiver all data packets of the set in the list having an indicator set to not transmitted. The second transceiver is configured to receive and save all data packets received and to transmit to the first transmitter an indication regarding data packets received.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As noted above, one major issue is the propagation delay. If the propagation delay could be eliminated, then efficiency would soar. It can't be eliminated, but it can be pipelined. Some communication systems can operate in full duplex, in which the sending station can still receive the ACK/NAK from the receiving station, even as the sending station keeps transmitting. This technique is exemplified in published patent application WO2016205129 incorporated herein by this reference. The sending station does not need to wait for the ACK/NAK before proceeding to transmit the next packet. However, the sender must always keep track of which packets need to be transmitted or retransmitted. The sender simply keeps a list of all packets needing transmission. It cycles through this list, constantly transmitting. Whenever it receives an ACK for a packet, it removes that packet from the list. In this fashion, we are guaranteed that all packets will eventually be transmitted, and that the transmitter constantly makes use of the channel. If a NAK is received, the sending station may decide to bump the priority of the NAKed packet to retransmit early. This may be desirable, for example, if incremental construction of an image is being performed at the receiving station. This method of reliable transmission is herein called Assured Data Transfer (ADT). It is far more difficult to list a timeline for ADT, since ACK/NAK packets can arrive at the sending station at any time. What is guaranteed is that the sending station constantly sends packets each packet duration interval, and that the receiving station sends ACK/NAK at that same interval. The receiving station will return an ACK every time a packet is successfully received regardless of the number of time this happens.

On the surface, it might appear that ADT is ultimately efficient, and that packet size is completely arbitrary. This is not quite true. There is a certain overhead involved in packetizing the data. A packet header is necessary, indicating number of packets to be transmitted, number of the present packet, and the validity check data. If the packet size is too small, then the efficiency is harmed by the overhead data. If the packet is too large, then the probability that it must be retransmitted due to error will harm efficiency.

In this invention, the ideal packet size and optimum overall efficiency of both ARQ and ADT, is computed based on the probability that any given symbol will be corrupted in transmission, the packetization overhead and, in the case of ARQ, the propagation delay.

Defining:

$P_e$ Probability error for a packet $\tau$ The overhead for full-duplex, or overhead plus ACK/NAK delay for half duplex. In symbol durations.

N Number of symbols in a packet $P_p$ Probability of error for a packet: $P_p = 1-(1-P_e)^N$ When a packet is sent, there is a probability $P_p$ that the packet will need to be retransmitted. However, there is a probability that the retransmitted packet may itself need to be retransmitted. Analyzing this, the expected number of transmissions for any given packet is given by:

$$M = \sum_{i=0}^{\infty} P_p^i = \frac{1}{1-P_p} = \frac{1}{(1-P_e)^N}$$

The expected amount of time to send a packet—measured in symbol intervals, is given by:

$$T_{packet} = (N+\tau)M = \frac{(N+\tau)}{(1-P_e)^N}$$

Finally, the efficiency of the channel, which is the N symbol times divided by the optimum time to send those N symbols, is given by:

$$\text{Efficiency} = \frac{N}{T_{packet}} = \frac{N(1-P_e)^N}{(N+\tau)} = \frac{(1-P_e)^N}{\left(1+\frac{\tau}{N}\right)}$$

We begin by finding the packet length N that maximizes efficiency.

$$\frac{\partial \text{Efficiency}}{\partial N} = = \frac{\left(1+\frac{\tau}{N}\right)\ln(1-P_e)(1-P_e)^N + \frac{\tau}{N^2}(1-P_e)^N}{\left(1+\frac{\tau}{N}\right)^2}$$

Solving for where the partial derivative equals zero, we obtain a quadratic equation in N:

$$N^2 \ln(1-P_e) + \tau N \ln(1-P_e) + \tau = 0$$

Solving the quadratic (and allowing only for positive solutions for N):

$$N = \frac{\sqrt{\tau^2 \ln^2(1-P_e) - 4\tau\ln(1-P_e)} - \tau\ln(1-P_e)}{2\ln(1-P_e)} = \frac{\sqrt{\tau^2 - \frac{4\tau}{\ln(1-P_e)}} - \tau}{2}$$

It is possible that there is no meaningful efficiency maximizer, either due to the determinant being negative, or due to only negative solutions for N. In those cases, we see that efficiency monotonically decreases with increasing N, so that the best solution for those cases is the shortest possible packet.

Suppose a high-speed transmission is desired over a distance of 1500 meters using an underwater acoustic modem with a QFSK modem, CRC32 at 2,000 bits per second (1000 symbols per second). Assume a symbol error rate of 0.001. 1500 meters per second is the propagation speed for water.

For full-duplex, τ is the time for the CRC, which is 32 bits, or 16 symbols.

For half-duplex, the ACK/NAK delay is 2000 symbols (one second each way, 1000 symbols per second), so we have τ=2016.

| Type | Optimum N | Efficiency |
|---|---|---|
| Full-duplex | 127 symbols | 0.78 |
| Half-duplex | 1741 symbols | 0.08 |

There are other tradeoffs possible. Increasing power reduces probability of error (to some extent in underwater acoustic modems). Behaviors changes as a function of symbol error rate. It can be seen from the equations that the optimum packet length increases with better error rates. To achieve maximum efficiency under conditions of low error rate, the ideal packet size becomes large—increasing overall latency of the communication path. See FIGS. 1-3.

Figure 1:
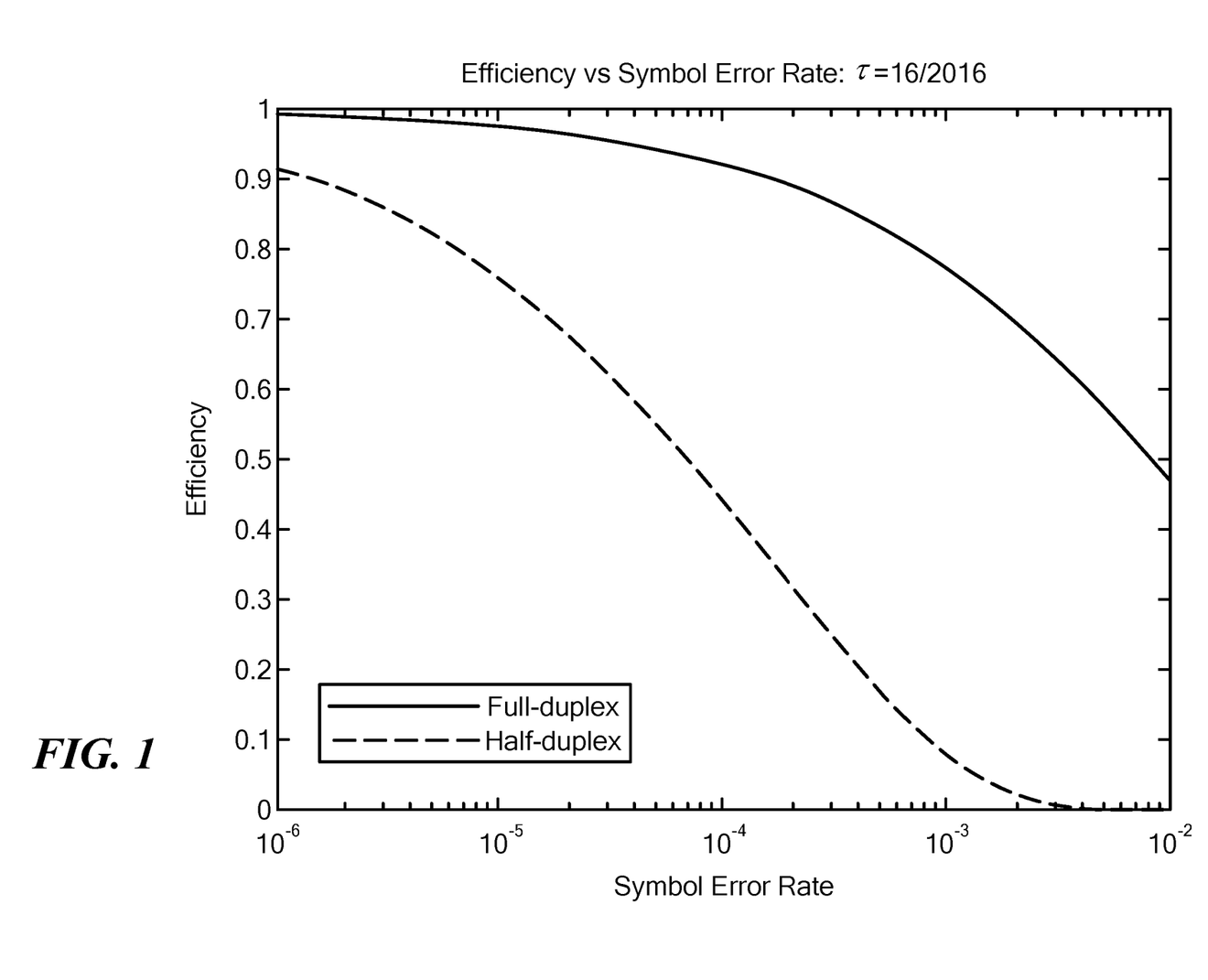
FIG. 1 is a graph of efficiency versus symbol error rate.
Figure 2:
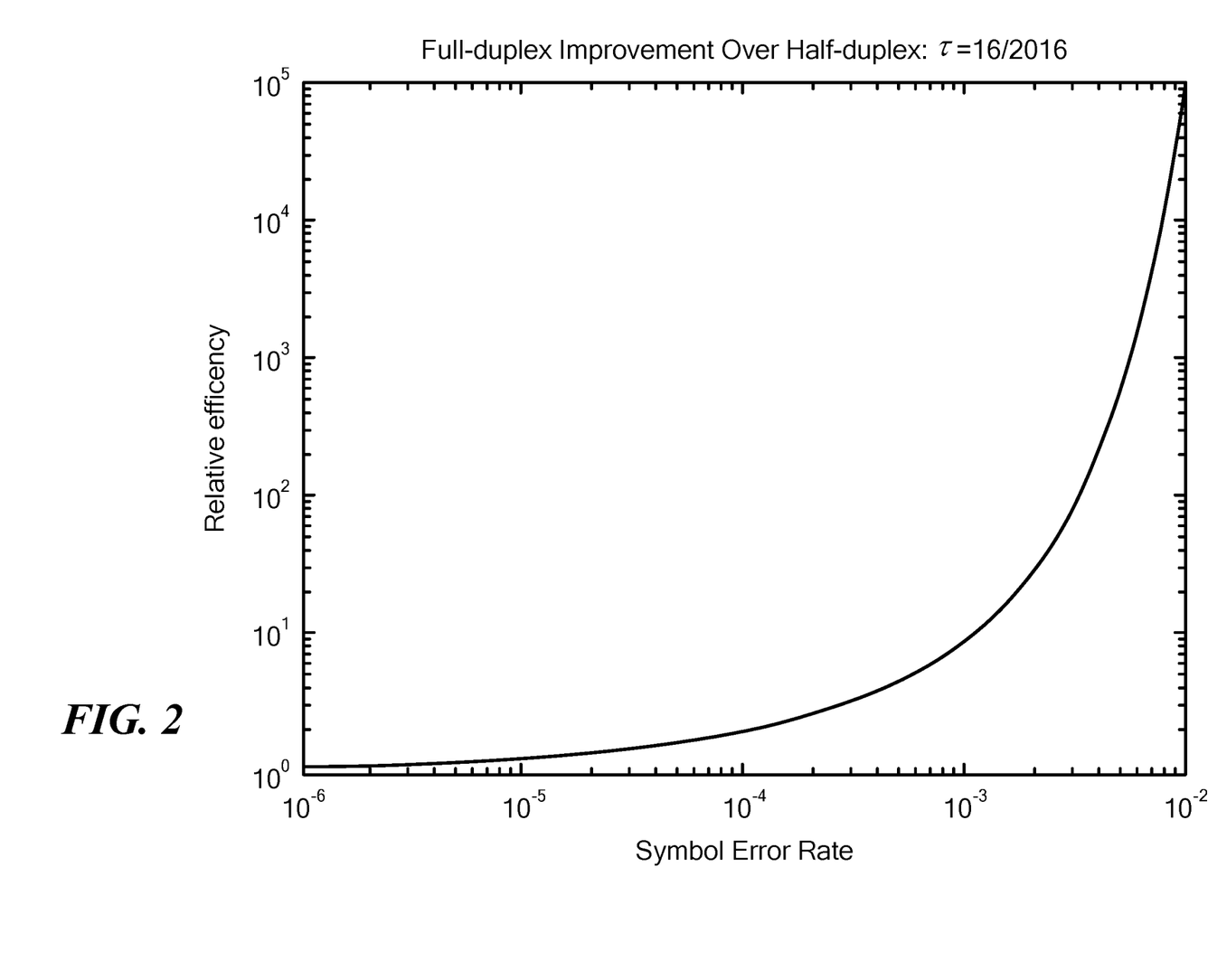
FIG. 2 is graph of relative efficiency versus symbol error rate.
Figure 3:
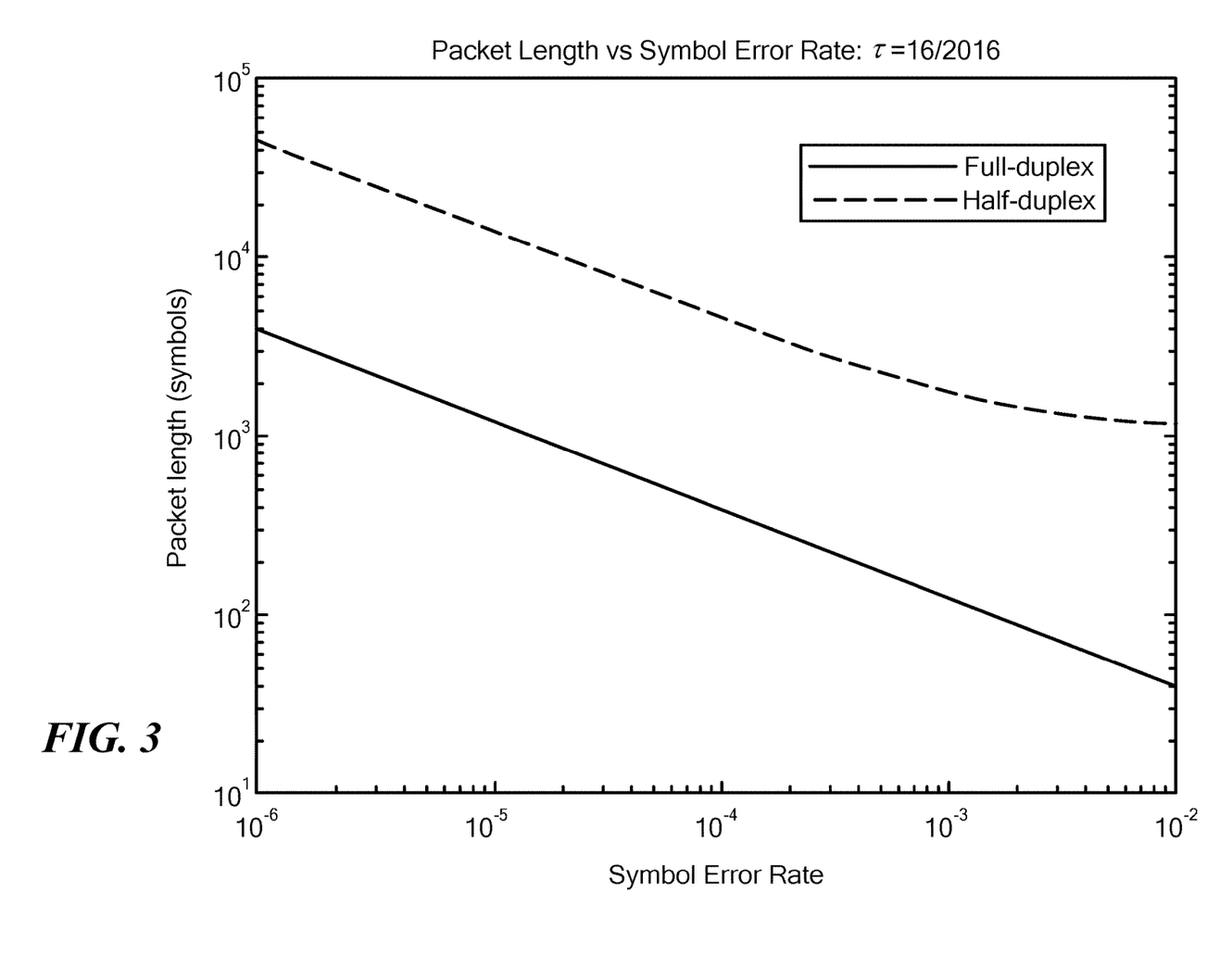
FIG. 3 is a graph of packet length versus symbol error rate.

For acoustic modems, a symbol error rate of somewhere between 1e-3 and 1e-4 is expected. In this regime, the full-duplex modem is 2-10 times more efficient than the half-duplex modem. Also note that packet sizes required for maximum efficiency are about 10 times smaller for the full-duplex modem, leading to far lower network latency. Note that the half-duplex modem essentially fails completely at symbol error rates greater than 1e-3, while the full-duplex modem is only moderately degraded at ten times that error rate.

This analysis is only valid for one-way communication. If K stations need to transfer data, the efficiency of the full-duplex modem does not change. The efficiency of the half-duplex modem drops by a factor of K. This benefit of full-duplex modems is especially important for mesh networks.

Note that even if the symbol error rate becomes very small (low noise, simple communication channel), and the relative efficiency of half-duplex starts to approach the efficiency of full-duplex, the optimum packet size for half-duplex is still much, much larger than the packet size for full-duplex. So even though efficiency may be similar, the overall latency of communication becomes much, much larger.

The fact that the transmitter are both on all the time with full-duplex ADT systems could cause them to appear to use more power than half-duplex systems. This is not the case since the overall time of the communications with full-duplex ADT systems is substantially shorter than half-duplex systems.

Figure 4:
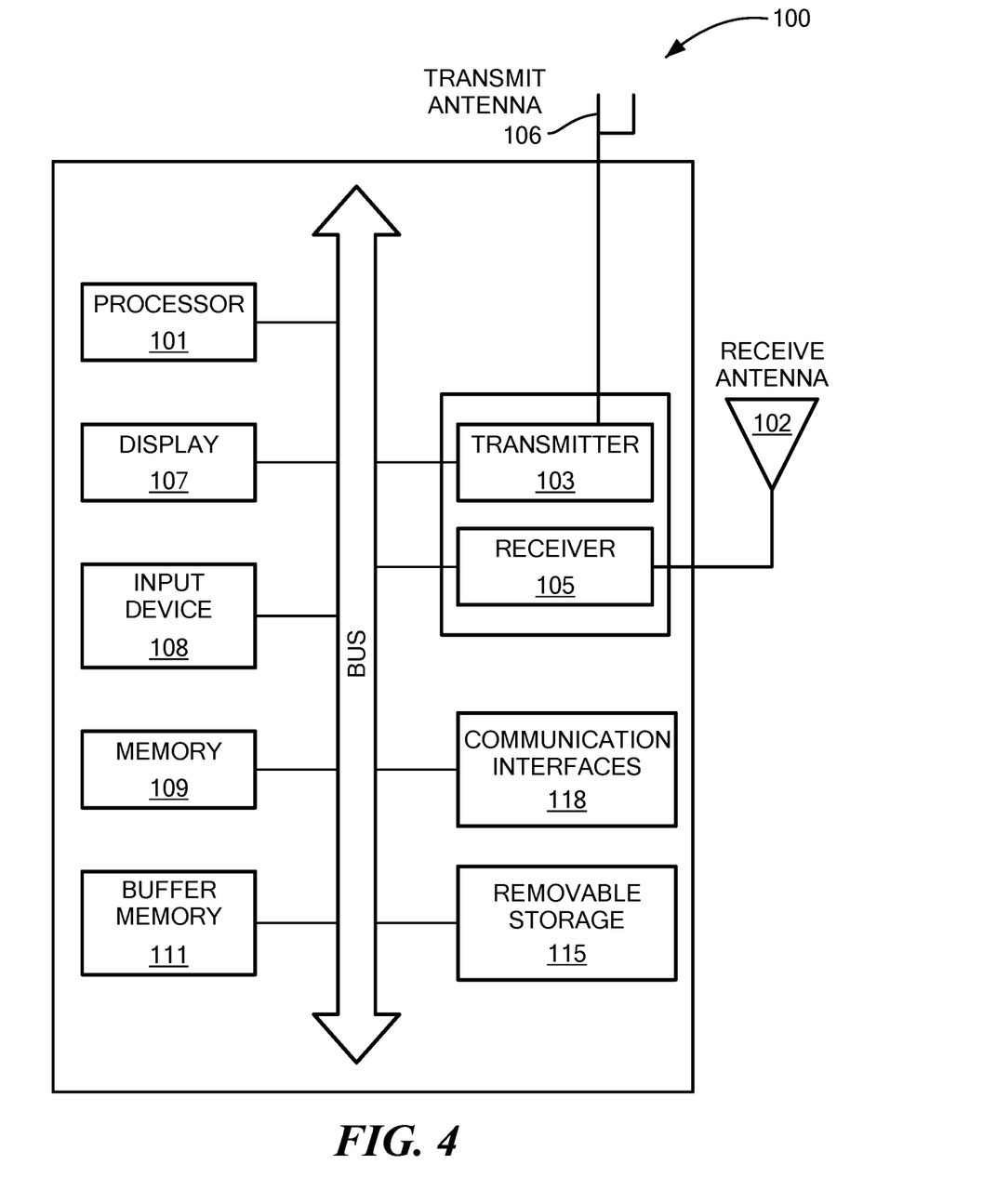
FIG. 4 is a block diagram showing the primary components associated with a full duplex communication system in accordance with an example of the invention.

Referring to the figures, FIG. 4 is a block diagram of a wireless communications device 100. The wireless communications device 100 comprises a processor 101, a transmitter circuitry 103 and a transmit antenna 106, a receiver circuitry 105 and receive antenna 102, a display 107, an input device 108, a memory 109 for storing operating instructions that are executed by the processor 101, a buffer memory 111, one or more other communications interfaces 113 (i.e. Ethernet, serial ports, and the like), and optionally a removable storage unit 115. The wireless communications device 100 can be an integrated unit containing at least all the elements depicted in FIG. 4, as well as any other elements necessary for the wireless communication device to perform its particular functions. Alternatively, the wireless communication device 100 may comprise a collection of appropriately interconnected units or devices, wherein such units or devices perform functions that are equivalent to the functions performed by the elements of the wireless device 100. For example, the wireless communication device 100 may comprise a laptop computer and a wireless LAN (local area network) card.

Figure 5:
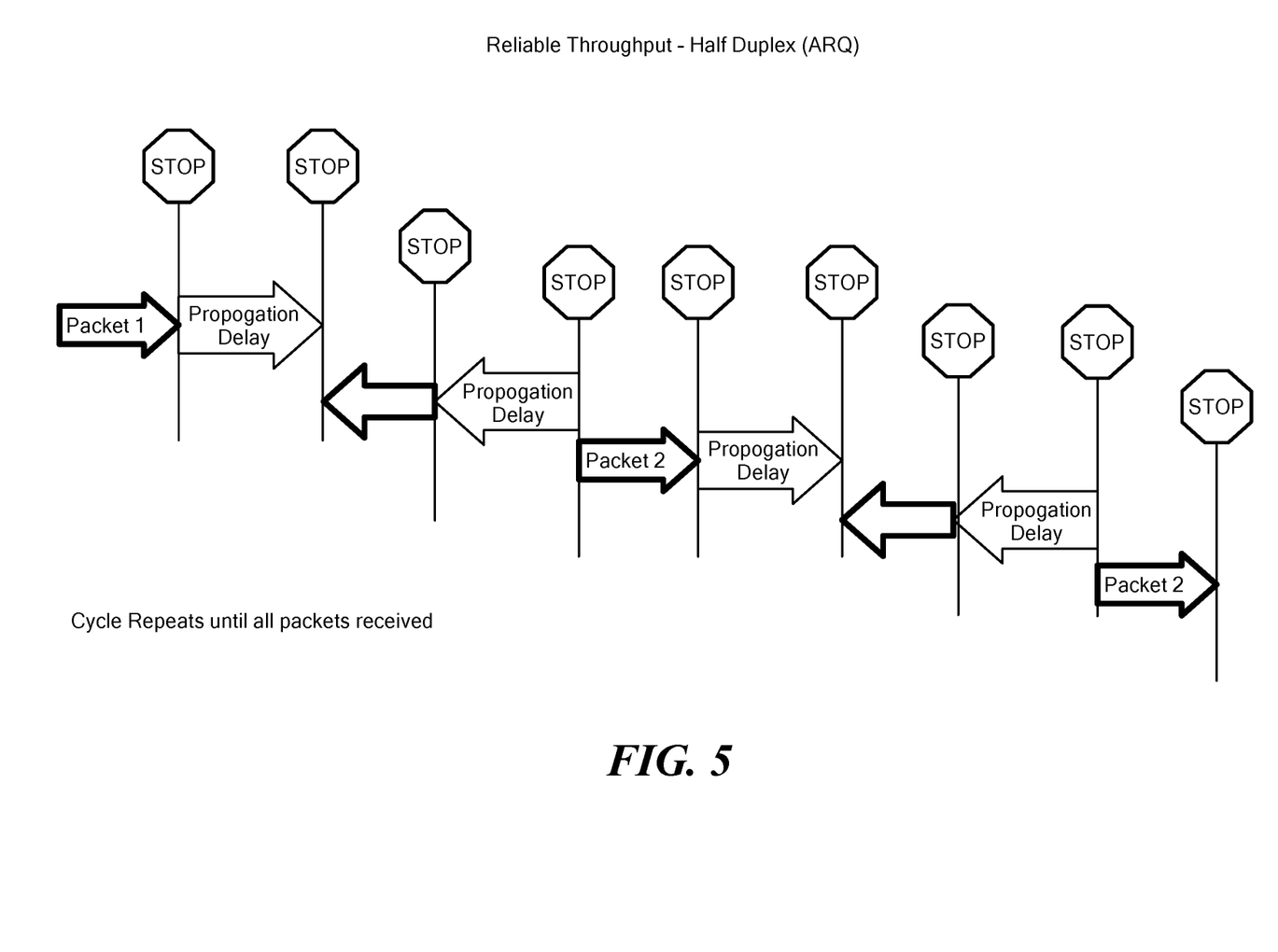
FIG. 5 illustrates a model of ARQ with the possible delays due to repeat attempts and the need to stop and go due to half-duplex.

Current state of the art half duplex packet transfer is illustrated in FIG. 5. Packets are sent one at a time with a stop in transmission after each send. This pause is required to allow the packet to reach the receiver and for the receiver to send back to the sender an Ack or Nack. The sender will not proceed with the next packet in sequence until the receiver responds with an Ack. Each exchange of packet sent and response confirmed with Ack or Nack requires the both sender and receiver to stop transmitting due to the lack of ability to receive while transmitting. This is the definition of half duplex. The result is each stop in transmission reduces the channel utilization.

Figure 6:
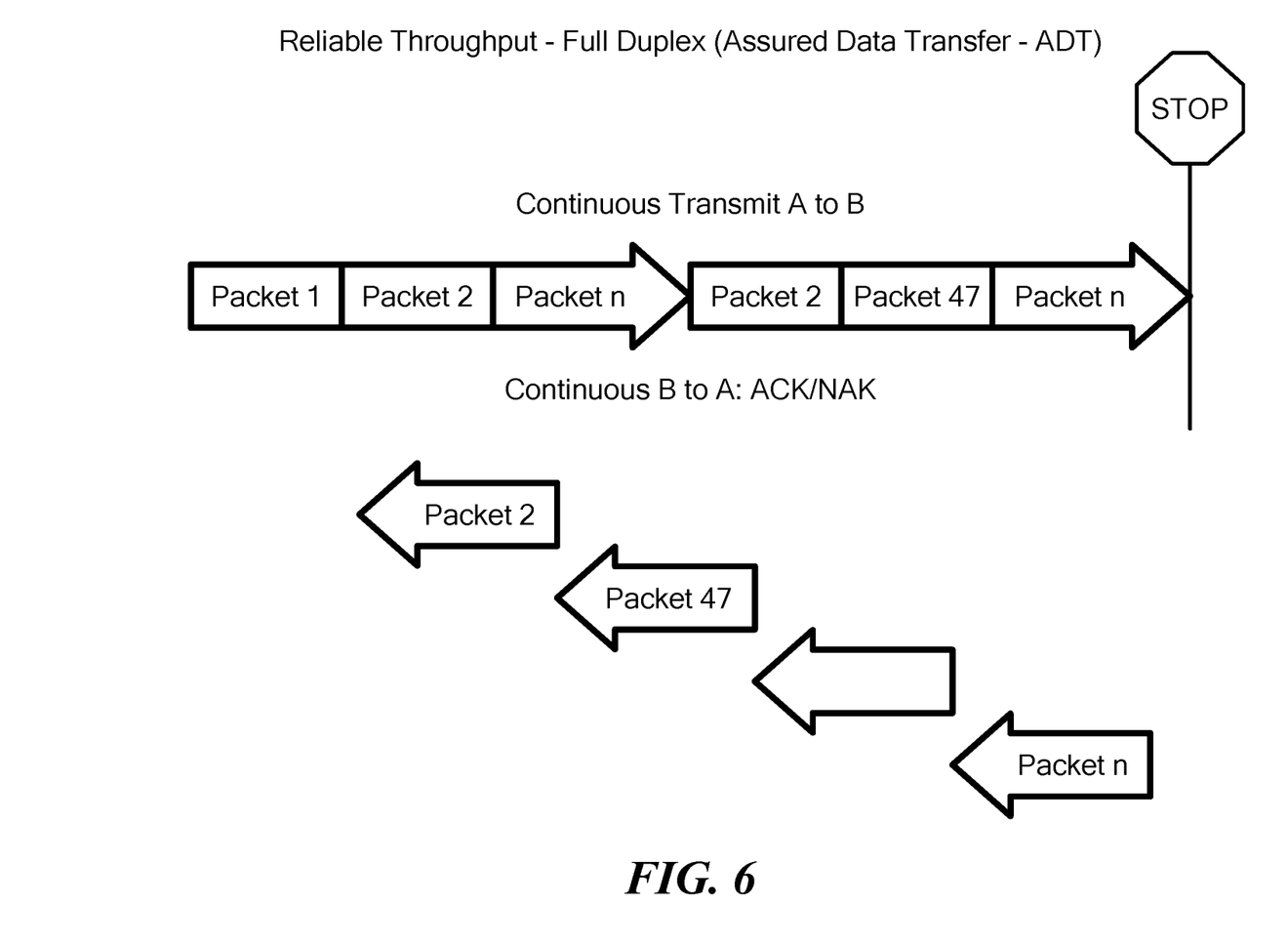
FIG. 6 illustrates a model of the invention ADT which replaces techniques such as ARQ when full-duplex is possible.

Full duplex, which allow transmitting while receiving, is illustrated in FIG. 6. The sender sends continuously the list of packets which have not been Ack'ed by the receiver without waiting. The receiver receivers the stream of packets and continuously responds with Ack or Nack for each continuously while receiving. Neither sender nor receiver needs to stop transmitting at any time which is the definition of full duplex. The channel utilization is maximized by reducing the stopping of transmission by either sender or receiver.

Figure 7:
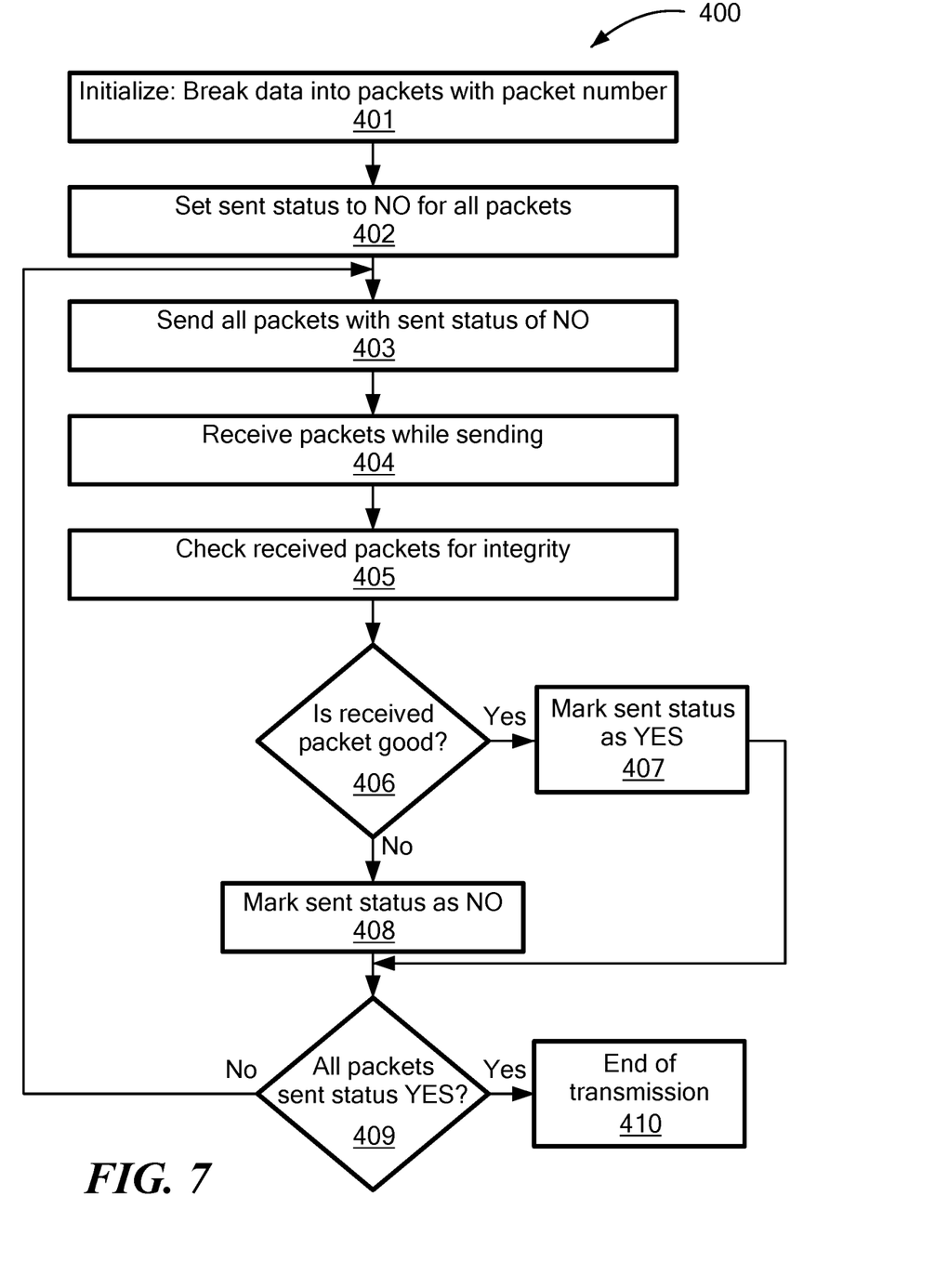
FIG. 7 is a flowchart illustrating a method for packet length and data rate control made possible with the invention ADT.

As illustrated in FIG. 7, the ADT packet management and control method 400 begins with an initial operation 401 including creating a list of packets out of the data to be transmitted with a transmitted status bit. This transmitted status bit is used to control which packets need to be transmitted.

Next, in operation 402, the entire list of packets has their transmitted status bit is set to NO. This indicates that the packet has not successfully been transmitted to the receiver.

Next, in operation 403, the entire list of packets is checked for packets with their transmitted status bit set to NO. Packets with a NO status are transmitted to the receiving modem. Both the receiving and transmitting modem are always checking for packets while transmitting packets to each other.

Next, in operation 404, packets received are examined to determine if they are from the receiving modem and directed to the transmitting modem.

Next, in operation 405, packets found in operation 404 are check to insure the data is intact. Packets found to not be intact are discarded.

Next, in operation 406, intact packets from operation 405 are checked for being ACK or NAK types.

Next, in operation 407, packets from operation 406 which are ACK types will have their transmitted status bit set to YES.

Next, in operation 408 packets from operation 406 which are NAK types will have their transmitted status bit set to NO.

Next, in operation 409, the entire list of packets is checked to see if any have a transmitted status of NO. If none are found, the data transfer is complete and the next operation is 410 else, the next operation is 403.

Next, in operation 410, the data transfer is complete and the process stops.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A full duplex data transfer method comprising:
configuring a first transceiver to transmit and receive data packets;
configuring a second transceiver to transmit and receive data packets;
at the first transceiver, adding a status indicator to each data packet in a set of data packets, setting the status indicator of each data packet to not transmitted, and maintaining a list of data packets having a status indicator set to not transmitted;
transmitting all said data packets of the set from the first transceiver to the second transceiver while receiving transmissions from the second transceiver;
at the second transceiver, saving all data packets received and transmitting an indication regarding the data packets received back to the first transceiver;
at the first transceiver, setting the status indicator of all data packets in the list received by the second transceiver to received; and
at the first transceiver, retransmitting to the second transceiver all data packets of the set in the list having an indicator set to not transmitted.

2. The method of claim 1 in which the first transceiver initializes a transmission to the second transceiver by transmitting to the second transmission a request to initiate a transmission with an indication of the total number of packets to be transmitted.

3. The method of claim 2 in which, the second transceiver, upon receipt of the request, transmits an acknowledgment of the request to the first transceiver.

4. The method of claim 1 in which the status indicator is a bit in each data packet.

5. The method of claim 1 in which transmissions from the first transceiver to the second transceiver and transmissions from the second transceiver to the first transceiver are continuous.

6. The method of claim 5 in which transmissions from the first transceiver to the second transceiver are via a predetermined band of frequencies and transmissions from the second transceiver to the first transceiver are via the same predetermined band of frequencies.

7. A full duplex data transfer system comprising:
a first transceiver configured to:
transmit and receive data packets,
add a status indicator to each data packet in a set of data packets,
set the status indicator of a set of data packets to not transmitted,
maintain a list of packets having a status indicator set to not transmitted,
transmit said set of data packets to a second transceiver,
set the status indicator of all data packets in the list received by the second transceiver to transmitted, and
retransmit to the second transceiver all data packets of the set in the list having an indicator set to not transmitted; and
a second transceiver configured to:
receive and save all data packets received, and
transmit to the first transmitter an indication regarding data packets received.

8. The system of claim 7 in which the first transceiver is configured to initialize a transmission to the second transceiver by transmitting to the second transmission a request to initiate a transmission with an indication of the total number of packets to be transmitted.

9. The system of claim 8 in which the second transceiver, upon receipt of the request, transmits an acknowledgment of the request to the first transceiver.

10. The system of claim 7 in which the status indicator is a bit in each data packet.

11. The system of claim 7 in which transmissions from the first transceiver to the second transceiver and transmissions from the second transceiver to the first transceiver are continuous.

12. The system of claim 11 in which transmissions from the first transceiver to the second transceiver are via a predetermined band of frequencies and transmissions from the second transceiver to the first transceiver are via the same predetermined band of frequencies.

\* \* \* \* \*